No. 854,176. PATENTED MAY 21, 1907.
J. A. PAPOT.
TRANSMITTING MECHANISM.
APPLICATION FILED NOV. 27, 1906.
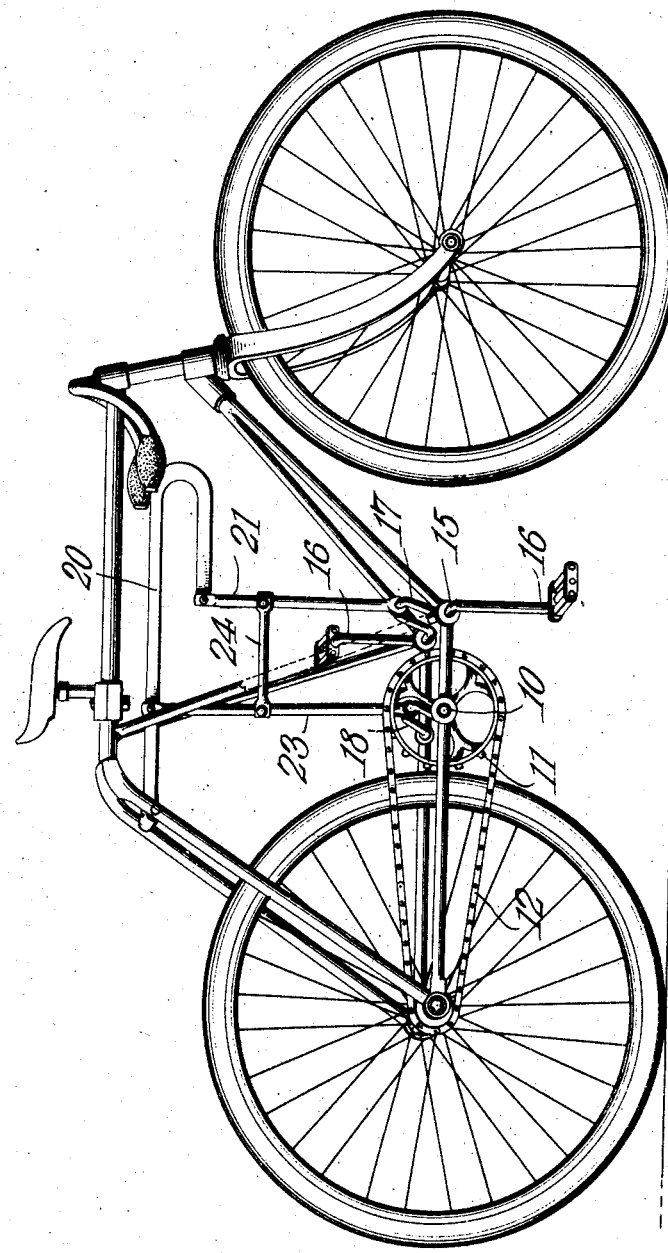
WITNESSES: James A. Papot, INVENTOR
By C. A. Snow & Co
ATTORNEYS.

UNITED STATES PATENT OFFICE.

JAMES ALEXANDER PAPOT, OF LOS ANGELES, CALIFORNIA.

TRANSMITTING MECHANISM.

No. 854,176.  Specification of Letters Patent.  Patented May 21, 1907.

Application filed November 27, 1906. Serial No. 345,317.

*To all whom it may concern:*

Be it known that I, JAMES ALEXANDER PAPOT, a citizen of the United States, residing at Los Angeles, in the county of Los Angeles and State of California, have invented a new and useful Power-Transmitting Mechanism, of which the following is a specification.

This invention relates to power transmitting mechanism, and while capable of use in connection with various classes of machinery, it is designed more especially for use in the propulsion of bicycles and like vehicles.

The object of the invention when applied to a bicycle is to so arrange the driving mechanism that the rider may sit well forward of the rear or driving wheel, and in which pedal levers of greater length than usual may be employed.

With this object in view, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

The accompanying drawing is a perspective view of a bicycle having a power transmitting mechanism constructed in accordance with the invention.

Similar numerals of reference are employed to indicate corresponding parts throughout the several figures of the drawings.

In the construction shown in the drawing, the contour of the frame is similar to that employed in a safety bicycle of the usual construction, with the exception that the frame is somewhat longer than usual.

The frame is provided with bearings for the support of a shaft 10 carrying a sprocket wheel 11 that is connected by a link belt 12 to a sprocket wheel on the hub of the rear wheel in much the same manner as an ordinary sprocket wheel driving device.

At a point in advance of the shaft 10 the frame is provided with a second shaft 15, to the opposite ends of which are secured pedal levers 16 which may be of greater length than usual. At the center of the shaft 15 is arranged a crank 17, and at a point near the center of the shaft 10 is a second crank 18, this latter crank being smaller or of less throw than the crank 17.

Pivoted to the rear fork of the frame is a lever 20 which is extended forward in the direction of the steering post, and this is turned downward and rearward, its extreme end being pivotally connected to a pitman 21, the lower end of which is connected to the crank 17.

At a point near the fulcrum of the lever 20 is pivoted the upper end of a pitman 23, the lower end of which is connected to the short crank 18.

In the operation of the mechanism as thus far described, the turning of the pedal crank shaft operates through the crank 17 to move the pitman 21, and the latter transmits movement to the lever 20. As the pitman 21 is connected to the lever 20 at a point near the free end of the latter, the movement of said lever will be transmitted to the pitman 23 with increased force, but through a shorter distance, and this movement is transmitted through the pitman 23 to the short crank 18.

In order to carry the shorter crank past the center, the two pitman rods 21 and 23 are connected by a link 24, so that swinging movement of the pitman 21 in both directions will be transmitted to the pitman 23. During operation, the two pitman rods will move in either diverging or converging paths, and this is compensated for by the difference in length of the pitmen, the difference in the points of connection of the pitmen with the lever 20, and the difference between the fulcrum points of the pitmen and the pivotal points of the link.

I claim:—

The combination with driving and driven cranks, of which the driving crank is of greater throw than the driven crank, a lever fulcrumed at a fixed point, a pair of pitman rods connecting the cranks to the lever at the same side of the fulcrum, the pitman rod of the driving crank being at a greater distance from the fulcrum than the pitman rod connection of the driven crank, and a link connecting the two pitman rods to insure movement of the driven crank past a dead center.

In testimony that I claim the foregoing as my own, I have hereto affixed my signature in the presence of two witnesses.

JAMES ALEXANDER PAPOT.

Witnesses:
 D. S. BURSON, Jr.,
 C. O. WINTERS.